(12) United States Patent
Johnson et al.

(10) Patent No.: US 9,240,257 B2
(45) Date of Patent: Jan. 19, 2016

(54) SOLID, LITHIUM-SALT-DOPED, THERMOSET POLYIMIDE POLYMER ELECTROLYTE AND ELECTROCHEMICAL CELL EMPLOYING SAME

(75) Inventors: Lonnie G. Johnson, Atlanta, GA (US); Lazbourne A. Allie, McDonough, GA (US); James R. Muller, Decatur, GA (US)

(73) Assignee: Johnson IP Holding, Inc., Atlanta, GA (US)

(*) Notice: Subject to any disclaimer, the term of this patent is extended or adjusted under 35 U.S.C. 154(b) by 987 days.

(21) Appl. No.: 13/177,053

(22) Filed: Jul. 6, 2011

(65) Prior Publication Data

US 2013/0011745 A1 Jan. 10, 2013

(51) Int. Cl.
| | |
|---|---|
| H01M 10/0565 | (2010.01) |
| H01B 1/12 | (2006.01) |
| H01M 10/052 | (2010.01) |
| H01M 10/0568 | (2010.01) |

(52) U.S. Cl.
CPC .............. *H01B 1/122* (2013.01); *H01M 10/052* (2013.01); *H01M 10/0565* (2013.01); *H01M 10/0568* (2013.01); *H01M 2300/0082* (2013.01); *Y02E 60/122* (2013.01)

(58) Field of Classification Search
CPC .................................................. H01M 10/0656
USPC .................................................. 429/300–323
See application file for complete search history.

(56) References Cited

U.S. PATENT DOCUMENTS

| | | | |
|---|---|---|---|
| 5,888,672 A | 3/1999 | Gustafson et al. | |
| 6,673,496 B1 * | 1/2004 | Nakagawa et al. | 429/312 |
| 7,129,005 B2 | 10/2006 | Wensley et al. | |
| 2002/0045085 A1 * | 4/2002 | Formato et al. | 429/33 |
| 2004/0229127 A1 | 11/2004 | Wensley et al. | |
| 2004/0253520 A1 * | 12/2004 | Wensley et al. | 429/306 |
| 2009/0035664 A1 * | 2/2009 | Chiang et al. | 429/317 |
| 2010/0099029 A1 * | 4/2010 | Kinoshita et al. | 429/316 |

OTHER PUBLICATIONS

Jeffrey W Fergus. "Ceramic and polymeric solid electrolytes for lithium-ion batteries." Journal of Power Sources 195 (2010): 4554-4569.
Felix B. Dias, Lambertus Plump, and Jakobert B. J. Veldhuis. "Trends in polymer electrolytes for secondary lithiumbatteries." Journal of Power Sources 88 (2000): 169-191.
Hadar Mazor, Diana Golodnitsky, Yuri Rosenberg, Emanuel Peled, Wladek Wieczorek, and Bruno Scrosatid. "SolidComposite Polymer Electrolytes with High Cation Transference Number." Israel Journal of Chemistry vol. 48 2008: 259-268.
Mary Ann B. Meador, Valerie a. Cubon, Daniel A. Scheiman, and William R. Bennett. "Effect of Branching on Rod-Coil Block Polyimides as Membrane Materials for Lithium Polymer Batteries." Chem. Mater. 2003, 15: 3018-3025.

(Continued)

*Primary Examiner* — Kenneth Douyette
*Assistant Examiner* — James Lee
(74) *Attorney, Agent, or Firm* — Dorian B. Kennedy; Baker Donelson

(57) ABSTRACT

An electrolyte medium suitable for use as a separator for an electrochemical cell comprises a substantially solid, thermoset polyimide polymer matrix doped with a lithium salt. The lithium salt comprises lithium bis(trifluoromethanesulfonyl) imide (LITFSI).

8 Claims, 1 Drawing Sheet

(56) References Cited

OTHER PUBLICATIONS

Dean M. Tigelaar, Allyson E. Palker, Mary Ann B. Meador, and William R. Bennett. "Synthesis and Compatibility of Ionic Liquid Containing Rod-Coil Polyimide Gel Electrolytes with Lithium Metal Electrodes." Journal of the Electrochemical Society 155 (10) (2008): A768-A774.

Y. S. Pak and G. Xu. "Ionic transport measurements of LiCF.sup.3S0.sup.3 doped polyimide-diaminobenzenesulfonic acid copolymer." Solid States Ionics 67, (1993): 165-169.

S. B. Tian, Y. S. Pak, and G. Xu. "Polyimide-Polysiloxane-Segmented Copolymers as High-Temperature Polymer Electrolytes." Journal of Polymer Science Part B: Polymer Physics vol. 32, (1994): 2019-2023.

Jang-Hoon Park, Jong-Su Kim, Eun-Gi Shim, Kyung-Won Park, Young Taik Hong, Yun-Sung Lee, and Sang-Young Lee. "Polyimide gel polymer electrolyte-nanoencapsulated LiCoO.sup.2 cathode materials for high-voltage Li-ion batteries", Electrochemistry Communications 12 (2010): 1099-1102.

* cited by examiner

Nyquist plot

SOLID, LITHIUM-SALT-DOPED, THERMOSET POLYIMIDE POLYMER ELECTROLYTE AND ELECTROCHEMICAL CELL EMPLOYING SAME

RELATED APPLICATIONS

Not applicable.

TECHNICAL FIELD

This invention relates to electrolytes for electrochemical cells, and more particularly, the invention relates to a solid, lithium-salt-doped, thermoset polyimide polymer electrolyte and separator.

BACKGROUND OF THE INVENTION

Electrochemical cells, which include battery cells (also characterized as "batteries"), are useful articles that provide stored electrical energy that can be used to energize a multitude of devices, particularly portable devices that require an electrical power source. The cell is an electrochemical apparatus typically formed of at least one electrolyte (also referred to as an "electrolytic conductor") disposed between a pair of spaced apart electrodes. The electrodes are the reactants for a chemical reaction that is facilitated by ion transport through the electrolyte that, in turn, causes an electric current to flow between the electrodes when electrical contact is made between non-electrolyte-contacting ends of the electrodes. Typically, the electric current flows through an electric circuit that is completed by an object or device (generally referred to as the "load") to be powered. The flow of electrons through the electric circuit is accompanied and caused by a flow of ions in and through the electrolyte.

In a rechargeable battery cell, which is often referred to as a "secondary battery," after the cell has partially or fully discharged its electrical potential, the chemical reaction may be reversed by applying an electric current to the cell that causes electrons to flow in a reverse direction through the electrodes which thereby causes ions to be conducted through the electrolyte in a reverse direction as well. Due to the chemical properties of lithium, secondary batteries that have lithium as the sole or predominant electrode material are very desirable because of the high energy density and high power density such batteries provide.

Two types of lithium cells/batteries that are desirable are so-called lithium metal batteries and lithium-ion batteries. They are distinguished from each other by the types of anode used. Lithium metal batteries employ lithium metal anodes whereas lithium-ion batteries employ lithium reactive (also called "active") anodes. An example of a lithium reactive anode is anode material such as graphite having interstices into which lithium ions are intercalated to await reaction. A separator is positioned between the anode and cathode to prevent electrical contact between the two. The separator is typically porous or a soft liquid polymer gel material configured to allow electrolyte to extend between the anode and cathode as a continuum for ion conduction.

Internal short circuits can occur in lithium metal and lithium-ion batteries. The main source of internal shorts has been mossy lithium growth that occurs during recharge. Low density dendritic lithium plated during recharge can grow through the separator resulting in a short circuit, particularly if the separator is porous or a soft solid such as a gelled polymer that can be easily penetrated by the growth.

Such shorts can result in high rate self-discharge which can cause overheating. Heat generated by an internal short can vaporize the electrolyte resulting in extreme pressure and rupture of the battery casing. Temperatures can be high enough to ignite escaping electrolyte vapors causing continuing degradation with lithium participating in the burning reaction releasing violent levels of energy and, ultimately, causing a fire.

Lithium-ion batteries were developed to eliminate mossy lithium growth at the anode by using an active material such as graphite or silicon to intercalate the lithium supplied to the anode during recharge.

Although lithium-ion batteries are much safer than earlier designs that employed lithium metal anodes, violent failures still occur.

As an approach to solving the dendrite-growth problem in lithium batteries efforts have been undertaken to provide a separator that effectively inhibits the passage of dendrites but that does not inhibit the conduct of lithium ions. Such efforts have met with limited success. Solid polymers that conduct lithium ions have been investigated for use as separators. One type of solid polymer that has been researched for development as a lithium-ion conductor is poly(ethylene oxide) (PEO). Related literature on the topic includes:

Jeffrey W. Fergus. "Ceramic and polymeric solid electrolytes for lithium-ion batteries." *Journal of Power Sources* 195 (2010): 4554-4569.

Felix B. Dias, Lambertus Plomp, and Jakobert B. J. Veldhuis. "Trends in polymer electrolytes for secondary lithium batteries." *Journal of Power Sources* 88 (2000): 169-191.

Hadar Mazor, Diana Golodnitsky, Yuri Rosenberg, Emanuel Peled, Wladek Wieczorek, and Bruno Scrosatid. "Solid Composite Polymer Electrolytes with High Cation Transference Number." *Israel Journal of Chemistry* Vol. 48 2008: 259-268.

Mary Ann B. Meador, Valerie A. Cubon, Daniel A. Scheiman, and William R. Bennett. "Effect of Branching on Rod-Coil Block Polyimides as Membrane Materials for Lithium Polymer Batteries." *Chem. Mater.* 2003, 15: 3018-3025.

Dean M. Tigelaar, Allyson E. Palker, Mary Ann B. Meador, and William R. Bennett. "Synthesis and Compatibility of Ionic Liquid Containing Rod-Coil Polyimide Gel Electrolytes with Lithium Metal Electrodes." *Journal of The Electrochemical Society* 155 (10) (2008): A768-A774.

However, one inadequacy of the PEO polymer as a separator is that it performs best at low temperatures. This can be a problem because the temperature of a rechargeable cell will rise when it is cycled between discharge and charge. When the temperature of the cell increases, the temperature of the PEO separator likewise increases. An increase in temperature causes the PEO separator to soften and become less effective in inhibiting dendrite penetration. In addition, multiple recycling may cause the PEO separator to degrade for reasons other than an increase in temperature.

Another characteristic of PEO when used as a separator that is problematic relates to a structural change that occurs when the separator is wetted by liquid electrolyte solvents that are typically employed in rechargeable cells. When PEO is wetted with either a liquid electrolyte or the solvent that comprises the liquid electrolyte, the separator softens and swells as it becomes plasticized. The swelling mechanism is caused by the molecules of the separator structure moving further apart. The resulting softening and extended spacing of molecules promotes improved conductivity of lithium ions but also decreases the effectiveness of the PEO structure as a separator because it permits the extension of dendrites through the separator.

Kynar® brand of polyvinylidene fluoride (PVDF) is another polymer that has been investigated as a separator for lithium cells. Kynar® is a registered trademark owned by Arkema Inc., 900 First Avenue, King of Prussia, Pa. 19406. Kynar® PVDF polymer has been used as a separator in a manner similar to the use of PEO as a separator. As in the case of the PEO-liquid-electrolyte/solvent combination described above, a Kynar® PVDF polymer matrix that is infused with a liquid electrolyte or solvent also swells. And also as in the case of PEO, swelling promotes the passage of dendrites. Related literature on the use of Kynar® PVDF polymer as a separator includes:

Jeffrey W. Fergus. "Ceramic and polymeric solid electrolytes for lithium-ion batteries." *Journal of Power Sources* 195 (2010): 4554-4569.

Felix B. Dias, Lambertus Plomp, and Jakobert B. J. Veldhuis. "Trends in polymer electrolytes for secondary lithium batteries." *Journal of Power Sources* 88 (2000): 169-191.

Polyimides also have been investigated for use as separators. Polyimides are a group of polymers that are considered to be robust and high-performance polymers. These polymers are capable of operating at high temperatures and have high mechanical strength. Polyimide polymers have been considered as solid polymer electrolytes for batteries and fuel cells as conductors for both protons and lithium ions. Literature related to this topic includes:

Mary Ann B. Meador, Valerie A. Cubon, Daniel A. Scheiman, and William R. Bennett. "Effect of Branching on Rod-Coil Block Polyimides as Membrane Materials for Lithium Polymer Batteries." *Chem. Mater.* 2003, 15: 3018-3025.

Dean M. Tigelaar, Allyson E. Palker, Mary Ann B. Meador, and William R. Bennett. "Synthesis and Compatibility of Ionic Liquid Containing Rod-Coil Polyimide Gel Electrolytes with Lithium Metal Electrodes." *Journal of The Electrochemical Society* 155 (10) (2008): A768-A774.

Y. S. Pak and G. Xu. "Ionic transport measurements of $LiCF^3SO^3$ doped polyimide-diaminobenzenesulfonic acid copolymer." *Solid States Ionics* 67, (1993): 165-169.

S. B. Tian, Y. S. Pak, and G. Xu. "Polyimide-Polysiloxane-Segmented Copolymers as High-Temperature Polymer Electrolytes." *Journal of Polymer Science Part B: Polymer Physics* Vol. 32, (1994): 2019-2023.

Jang-Hoon Park, Jong-Su Kim, Eun-Gi Shim, Kyung-Won Park, Young Taik Hong, Yun-Sung Lee, and Sang-Young Lee. "Polyimide gel polymer electrolyte-nanoencapsulated $LiCoO^2$ cathode materials for high-voltage Li-ion batteries", *Electrochemistry Communications* 12 (2010): 1099-1102.

U.S. Pat. No. 5,888,672 issued Mar. 30, 1999, to Scott Gustafson and Joseph T. Antonucci, for POLYIMIDE BATTERY.

U.S. Patent Application Publication Number 2004/0229127 published Nov. 18, 2004, filed by inventors C. Glen Wensley and Scott Gustafson, for POLYIMIDE MATRIX ELECTROLYTE.

U.S. Pat. No. 7,129,005 issued Oct. 31, 2006, to C. Glen Wensley, Scott Gustafson, Craig R. Nelson, Robert W. Singleton, Alain Vallee, and Dany Brouillette for POLYIMIDE MATRIX ELECTROLYTE AND IMPROVED BATTERIES THEREFROM.

Pak et al. studied the lithium ion transport of $LiCF_3SO_3$-doped polyimide-diaminobenzenesulfonic acid copolymer. See Y. S. Pak and G. Xu. "Ionic transport measurements of $LiCF_3SO_3$-doped polyimide-diaminobenzenesulfonic acid copolymer." *Solid States Ionics* 67, (1993): 165-169. They were able to improve the conductivity of the un-doped polymer by three orders of magnitude to a best conductivity of $10^{-9}$ S/cm at 300 degrees C. However, this conductivity is still low for practical use in lithium-ion or lithium metal batteries.

Tian et al. investigated doping another copolymer, namely, polyimide-polysiloxane, with the salt $LiCF^3SO^3$. See S. B. Tian, Y. S. Pak, and G. Xu. "Polyimide-Polysiloxane-Segmented Copolymers as High-Temperature Polymer Electrolytes." *Journal of Polymer Science: Part B: Polymer Physics* Vol. 32, (1994): 2019-2023. These researchers noted an improvement in ionic conductivity from $10^{-9}$ to $10^{-7}$ S/cm at 300° C., but noted that ion conductivity was much lower ($10^{-10}$ S/cm) at room temperature.

Tigelaar and coworkers developed a rod-coil polyimide polymer-gel electrolyte that contains an ionic liquid. See Dean M. Tigelaar, Allyson E. Palker, Mary Ann B. Meador, and William R. Bennett. "Synthesis and Compatibility of Ionic Liquid Containing Rod-Coil Polyimide Gel Electrolytes with Lithium Metal Electrodes." *Journal of The Electrochemical Society* 155 (10) (2008): A768-A774. The researchers cross-linked polyimide and PEO to obtain a rod-coil structure, and then doped it with lithium trifluoromethanesulfonimide (LITFSI) salt. They were able to achieve high conductivity of $10^{-2}$ S/cm when the doped structure was soaked with an ionic liquid. The resulting gel-polymer that was formed was able to hold over 4 times its weight in ionic liquid. Even though this copolymer might be more thermally stable than PEO, the fact that it is a gel soaked with electrolyte still creates safety issues, namely, dendrites could be formed and the voltage (and current) at which the copolymer material will break down after repeated cycling is much lower than in a pure conductive polyimide.

U.S. Pat. No. 5,888,672 issued to Gustafson et al. discloses a battery wherein each of the anode, cathode and electrolyte layer is based upon soluble, amorphous, thermoplastic polyimide. The resulting electrolyte layer is a solid polyimide electrolyte. The inventors were able to obtain conductivity of $10^{-4}$ S/cm. The major problem with this polymer electrolyte is that the polymer used is a thermoplastic and is soluble in various solvents. Therefore, when used in a battery where liquid electrolyte is present the solvent from the electrolyte will dissolve or soften the polymer thus resulting in the formation of dendrites, which in turn results in short circuits.

There are other instances where a polyimide polymer is used to make a gel polymer electrolyte similar to the formation of a gel PEO polymer electrolyte described herein above. For example, in inventions disclosed in U.S. Patent Application Publication Number 2004/0229127 filed by inventors C. Glen Wensley and Scott Gustafson, and U.S. Pat. No. 7,129, 005 issued to inventors C. Glen Wensley, Scott Gustafson, Craig R. Nelson, Robert W. Singleton, Alain Vallee, and Dany Brouillette, the inventors used various polyimides and doped them with LITFSI salt and a solvent. In these instances the polyimides are soluble in the solvent and the solvent remains a part of the electrolyte system. Therefore the polymer, salt and solvent all participate in the ionic conduction mechanism. If the solvent to polymer ratio is high, the electrolyte membrane will be soft and cannot be used as an effective barrier for separating electrodes in batteries.

Polymer gel electrolytes that have been developed represent safety improvements over liquid electrolytes. Although these electrolytes will suppress dendritic shorts longer, there still remain operability and safety issues that are of concern. Because these gel electrolytes have pores filled with salts and solvent, there is a restriction in the temperature range of operation. One aspect of the problem is that the gel may melt at high temperatures and freeze at low temperatures and thus become unsuitable for its intended purpose. Another aspect of the problem is that the polymer is soluble in the solvent and may not be able to cycle at high voltages without breaking down and thus becoming an ineffective barrier. Thus there still is a need for the development of improved solid polymer electrolytes that are not soluble in the solvent for the liquid electrolyte and that will not break down during cycling.

SUMMARY OF THE INVENTION

According to an embodiment of the present invention, an electrolyte medium comprises a substantially solid, thermoset polyimide polymer matrix doped with a lithium salt. In an aspect of this embodiment, lithium salt comprises lithium bis(trifluoromethanesulfonyl)imide (LITFSI).

According to another embodiment of the present invention, a process for forming an electrolyte medium comprises providing a thermoset polyimide polymer pre-dissolved in N-methyl-2-pyrollidinone (NMP) to form a polyimide solution; providing a lithium salt pre-dissolved in N-methyl-2-pyrollidinone (NMP) to form a lithium-salt solution; mixing said polyimide solution and said lithium-salt solution in a ratio of about 2 parts polyimide solution to about 1 part lithium-salt solution to form a substantially homogeneous lithium-salt-doped polyimide solution; casting said lithium-salt-doped polyimide solution; and drying and curing said cast lithium-salt-doped polyimide solution to form a substantially solid lithium-salt-doped polyimide polymer film. In an aspect of this embodiment, lithium salt comprises lithium bis(trifluoromethanesulfonyl)imide (LITFSI). In another aspect of this embodiment, lithium salt is dissolved in said N-methyl-2-pyrollidinone (NMP) in a ratio of about 7 parts lithium salt to about 5.5 parts NMP. mixing said polyimide solution and said lithium-salt solution in a ratio of about 2 parts polyimide solution to about 1 part lithium-salt solution to form a substantially homogeneous lithium-salt-doped polyimide solution; casting said lithium-salt-doped polyimide solution; and drying and curing said cast lithium-salt-doped polyimide solution to form a substantially solid lithium-salt-doped polyimide polymer structure. In an aspect of this embodiment, lithium salt comprises lithium bis(trifluoromethanesulfonyl)imide (LITFSI). In another aspect of this embodiment, lithium salt is dissolved in said N-methyl-2-pyrollidinone (NMP) in a ratio of about 7 parts lithium salt to about 5.5 parts NMP.

According to a further embodiment of the present invention, an electrochemical cell comprises: an anode comprising one of a lithium metal material and a lithium-ion receptive active material; a cathode; and a substantially solid, thermoset polyimide polymer matrix doped with a lithium salt interposed between said anode and said cathode. In accordance with one aspect of this embodiment, a liquid electrolyte is infused within said cathode and at least partially contacts the matrix. In accordance with another aspect of this embodiment, the lithium-ion receptive active material comprises solid-state material. In accordance with a further aspect of this embodiment, the solid-state material comprises one of thin-film silicon and thin-film tin nitride. In accordance with yet another aspect of this embodiment, the lithium-ion receptive active material comprises intercalation material and liquid electrolyte. In accordance with yet a further aspect of this embodiment, the lithium salt comprises lithium bis(trifluoromethanesulfonyl)imide (LITFSI).

DETAILED DESCRIPTION

Figure 1:
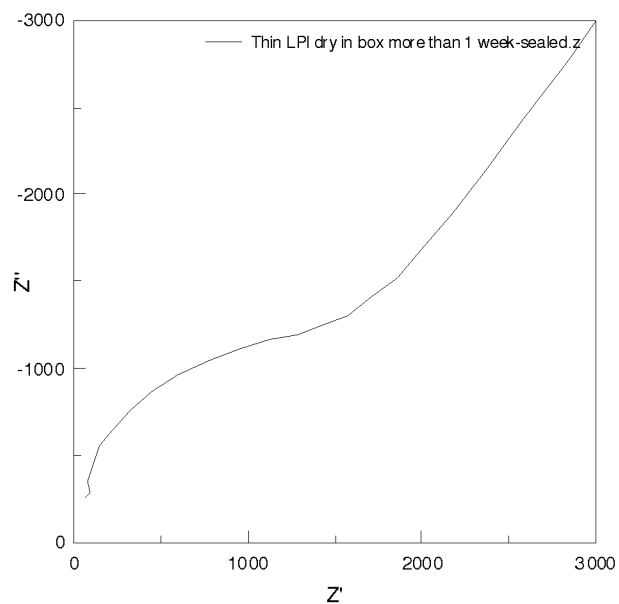
FIG. 1 is a Nyquist plot derived from testing of a sample of a substantially solid, thermoset polyimide polymer matrix doped with a lithium salt in accordance with an embodiment of the invention.

Embodiments of the present invention are described herein. The disclosed embodiments are merely exemplary of the invention that may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, at least some specific structural and functional details disclosed herein are not to be interpreted as limiting, but merely as a basis for the claims and as a representative basis for teaching one skilled in the art to variously employ the present invention.

The invention teaches an electrolyte medium suitable for use as a separator. The medium comprises a substantially solid, thermoset polyimide polymer matrix doped with a lithium salt.

Although the term "battery" technically may more properly define a combination of two or more cells, it has come to be used popularly to refer to a single cell. Thus the term battery by itself is sometimes for convenience of explanation used herein to refer to what is actually a single cell. The teachings herein that are applicable to a single cell are applicable equally to each cell of a battery containing multiple cells.

The thermoset polyimide (PI) polymer used to produce the solid electrolyte was Pyre ML-RC-5019, obtained from Industrial Summit Corporation. It is formed from a combination of Pyromellitic Dianhydride and 4,4'-Oxydianiline. The polymer was obtained in the form of a viscous solution comprising a powder pre-dissolved in N-methyl-2-pyrollidinone (NMP). A lithium salt used is lithium bis(trifluoromethanesulfonyl)imide (LITFSI). Other lithium salts that impart ion-conductive characteristics upon doping may also be used.

To form the invention's lithium-ion conductive, thermoset polymer matrix (or film), the salt, LITFSI, was first completely dissolved in NMP by mixing 7 g of LITFSI with about 5.5 g of NMP to form a stock solution (also referred to herein as a "salt solution"). This salt solution of LITFSI was then added to the polyimide solution in a ratio of 1:2 (LITFSI:PI) and mixed thoroughly to form a homogenous solution. In order to get rid of air bubbles the homogeneous solution was centrifuged. Then the solution was casted onto a clean glass sheet. The cast solution was then dried into a solid freestanding film in a vacuum oven at 100° C. It was further heated under vacuum at 200° C. to initiate the curing process overnight. The drying and curing processes were performed in a vacuum oven in order to prevent the film from absorbing moisture from the air and becoming porous due to the very hydroscopic nature of the LITFSI. The final curing was done in a furnace at 300° C. followed by storage in a dry glove box.

EXAMPLE OF PREPARATION

An electrolyte medium suitable for use as a separator was prepared utilizing the following process:
1. A quantity of Pyre ML-RC-5019 brand of thermoset polyimide polymer was dissolved in NMP to produce a polyimide solution.
2. 7 g of LITFSI was added to about 5.5 g of NMP to form a lithium-salt solution.
3. About 5 g of lithium-salt solution was added to about 10 g of polyimide solution to form a substantially homogeneous lithium-salt-doped polyimide polymer solution.
4. The lithium-salt-doped polyimide polymer solution was mixed thoroughly on a magnetic stirrer in a closed container.
5. The lithium-salt-doped polyimide polymer solution was cast at about 6 mil on a clean glass surface so as to form a matrix (which also may be referred to as a "film").
6. The glass with cast matrix was placed in a vacuum oven and the cast matrix was dried at about 100° C. under vacuum.
7. The matrix was cured under vacuum at 300° C. for 2 hours to produce a strong, freestanding lithium-ion conductive membrane.
8. The membrane was removed from the glass and stored in dry glove box.

Referring now to the drawings, certain of the various aspects of exemplary embodiments of the invention are illustrated. Referring first to FIG. 1, therein is illustrated a Nyquist plot derived from testing of a sample of a substantially solid, thermoset polyimide polymer matrix doped with a lithium salt in accordance with an embodiment of the invention. The point of inflection of the curve represents resistance of the sample associated with the conduction of lithium ions. This resistance was taken as about 1,700 ohms. From that resistance, conductivity of about $2.1 \times 10^{-6}$ S/cm was derived by conversion methods know in the electrochemical arts.

Figure 2:
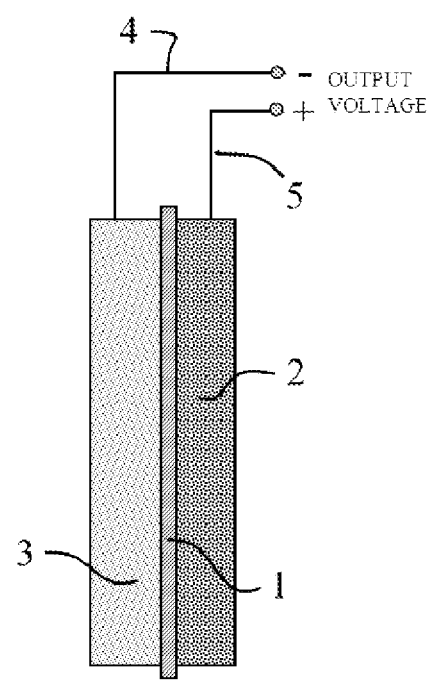
FIG. 2 is a schematic representation of an electrochemical cell incorporating an electrolyte medium in accordance with the teachings of the present invention.

Referring now to FIG. 2, therein is schematically illustrated an electrochemical cell 10 incorporating a substantially solid, thermoset polyimide polymer matrix doped with a lithium salt 1 in accordance with the teachings of the present invention. The matrix 1 is an electrolyte and a separator that is interposed between a cathode 2 and an anode 3. In an embodiment, the matrix 1 is a film suitable for use in thin-film or other small-scale cells and batteries. In the cell 10, a negative electrical terminal 4 is connected to the anode 3 and a positive electrical terminal 5 is connected to the cathode 2. In an embodiment, the cathode 2 may be infused with or otherwise include a liquid electrolyte. In such case, it is understood that the solvent component of the electrolyte may plasticize the polyimide separator, but only to a very limited extent. Generally any swelling will be less than about 2%. However, under such conditions, there will be an appreciable increase in ionic conductivity. Anode 3 may be a lithium metal anode or it may be an active anode. Active anodes may include solid-state, thin-film anodes such as thin-film silicon or thin-film tin nitride. Alternatively, the active anode may be comprised of intercalation material in combination with a liquid electrolyte.

The final solid polymer electrolyte is not soluble in the liquid electrolyte and will remain intact during cycling at high voltages. The solid electrolyte is also stable over a wide range of temperatures. It must be noted that even though the polymer is initially dissolved in N-methyl-2-pyrollidinone (NMP), by the time the curing process is complete, there should be no solvent remaining in the electrolyte. This phenomenon differentiates the solid polymer electrolyte of the present invention from a polymer gel. The ionic conductivity is also measured on a completely dried film that has been heated and dried in an inert glove box environment.

Many variations and modifications may be made to the above-described embodiments without departing from the scope of the claims. All such modifications, combinations, and variations are included herein by the scope of this disclosure and the following claims.

The invention claimed is:
1. A solid electrolyte medium comprising:
a substantially non-porous, solid, thermoset polyimide polymer matrix doped with a solid lithium salt to produce a dry electrolyte medium.
2. The electrolyte medium of claim 1, wherein said lithium salt comprises lithium bis (trifluoromethanesulfonyl)imide (LITFSI).
3. A solid-state electrochemical cell comprising:
an anode comprising either a lithium metal material or a lithium-ion receptive active material;
a cathode; and
a substantially non-porous, solid, thermoset polyimide polymer matrix doped with a solid lithium salt interposed between said anode and said cathode.
4. The electrochemical cell of claim 3, further comprising a liquid electrolyte infused within said cathode and at least partially contacting said matrix.
5. The electrochemical cell of claim 3, wherein said lithium-ion receptive active material comprises solid-state material.
6. The electrochemical cell of claim 5, wherein said solid-state material comprises one of thin-film silicon and thin-film tin nitride.
7. The electrochemical cell of claim 3, wherein said lithium-ion receptive active material comprises intercalation material and liquid electrolyte.
8. The electrochemical cell of claim 3, wherein said lithium salt comprises lithium bis(trifluoromethanesulfonyl)imide (LITFSI).

* * * * *